Figure 1:
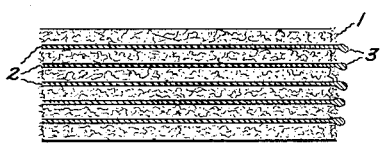

Aug. 8, 1933.  R. H. KIENLE ET AL  1,921,757
LAMINATED MOLDED PRODUCTS
Filed May 29, 1931

Resin concentrated on surfaces of individual laminae.

Resin uniformly distributed throughout fibrous mass.

Inventors:
Roy H. Kienle,
William J. Scheiber,
by Charles E. Mullen
Their Attorney.

Patented Aug. 8, 1933

1,921,757

UNITED STATES PATENT OFFICE 1,921,757

LAMINATED MOLDED PRODUCT

Roy H. Kienle, Schenectady, and William J. Scheiber, Troy, N. Y., assignors to General Electric Company, a Corporation of New York Application May 29, 1931. Serial No. 541,052

3 Claims. (Cl. 92—40)

The present invention relates to a novel method of making laminated molded products from pulp and to the product produced thereby. More specifically, this invention is concerned with the production of laminated molded products from pulp containing a resinous material therein which products are relatively thick in cross-section.

In the ordinary process of making laminated molded products pulp is first fabricated into paper of suitable thickness ranging from about 10 to 30 mils. This paper is then coated with suitable compositions on a standard varnish treating machine, oven dried and after stacking in multiple layers molded to the desired thickness by the application of heat and pressure. Such products are usually stronger mechanically than molded products made from powders. However, such products when submitted to high humidity exhibit a marked tendency of the material to develop hair line cracks and to delaminate. Moreover, the process involving varnish treating of individual laminæ of paper is expensive.

In accordance with our invention we are able to obviate the defects outlined above and in addition secure surprisingly unexpected and beneficial results in laminated molded products fabricated by the method of our discovery.

For a consideration of what we believe to be novel and our invention attention is directed to the following specification and the claims appended thereto and to the drawing accompanying and forming part of the specification.

Our process comprises, briefly, the incorporation of resinous compositions into wet paper pulp in any suitable manner, laminating the wet pulp containing the resinous compositions thereon and therein by suitable means, for example, by a multiple ply formation on a paper machine of the wet type, so as to obtain an interlocking of the fibers of the several plies thus giving a more homogeneous structure to the built-up mass. The mass is then dried, heat and pressure is applied and molded.

By means of our process we are able to obtain what we choose to call "fiber flow" when the mass is molded, in contradistinction to what we choose to call "resin flow" when ordinary laminated stock is molded. The significance of this will be more fully explained. In molding ordinary laminated stock, that is stock in which the individual laminæ have been coated either on a varnish treating machine or with powdered adhesive material, when heat and pressure is applied, the adhesive material, for example, resin, is observed to melt and flow to the edges of the molded piece. This is diagrammatically illustrated in Fig. 1 of the drawing which is an enlarged fragmentary showing of a product molded from laminated stock coated in the ordinary way. In this figure the fibrous sheets 1 are shown held together by the relatively thin layers of resinous composition 2 concentrated on the surfaces thereof. The resin has oozed out to the edges of the piece forming bead-like masses 3. Very little, if any, movement of the fibers is observed to take place.

Figure 2:
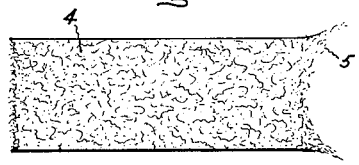

On the contrary, when the process of our invention is carried out entirely different results are observed. When the stock, wet laminated in accordance with our invention, is molded, very little, if any, resin is observed to collect at the edges of the piece, but instead, a marked tendency is noted for the entire mass to flow,—resin, filler, fiber and all. This tendency is particularly prevalent when a free flowing resin is present, if too high heat is employed or excessive pressure is applied, particularly if not too much curing has had an opportunity to take place. This tendency of the stack to flow as an entity is what is termed herein as "fiber flow". This is diagrammatically illustrated in Figure 2 of the drawing which is an enlarged fragmentary showing of a product molded from stock laminated in accordance with our invention. It is to be observed that the product is a homogeneous entity 4 containing the resin uniformly distributed throughout the mass which has flowed as an entity during molding as diagrammatically illustrated at 5. Due to this peculiar "fiber flow" it has been possible to successfully mold more intricate shapes than is normally possible with the ordinary laminating process. For instance, we have molded such articles as transformer spools, refrigerator chiller trays, ash trays, drinking cups and the like with the gain in strength that laminating gives over the use of molding powder. The homogeneous filling out of such intricate shapes is possible only with a stock possessing "fiber flow".

To briefly illustrate the difference in mechanical, electrical and physical properties of laminated stock produced by the ordinary process (I) and the process of our invention (II) the following table is given. In this comparison data is given for the same resin and the same type of fiber.

| Property | (I) | (II) |
|---|---|---|
| Modulus of rupture | 14000 | 19000 |
| Humidity 60° C | Marked tendency to crack. | No cracking. |
| Dielectric strength | 200 v/mil. | 450 v/mil. |
| Type of flow during molding. | Resin flow | Fiber flow. |
| Arc resistance | Poor—fails after 2-4 arcings. | Good—stands 50-150 arcings. |

In order to more fully illustrate our invention so that those skilled in the art to which it pertains may more easily practice the same the following examples are given. It is to be understood, however, that these examples are merely illustrative and not limiting in their nature.

Example 1

Aniline, hydrochloric acid and formaldehyde are caused to interact in a suitable container, for example, the ordinary paper mill beater, employing the following proportions:

|  | Pounds |
|---|---|
| Water | 15,000 |
| Aniline | 920 |
| Hydrochloric acid (36%) | 990 |
| Formaldehyde (38.8%) | 912 | and substantially as follows:

The aniline and water are first mixed together, the hydrochloric acid added and the temperature adjusted to about 28° C. The formaldehyde solution is then run in as rapidly as possible. The temperature of the mixture is kept below 40° C. After the mixture has stood for an hour a clear red liquor is obtained and suitable pulp, for example, rag, linen, sulfite, rope, hemp, bagasse, kraft or the like, is furnished to the beater in the partially or completely beaten form. The amount of pulp used depends on the final resin content desired. A suitable amount for use is 1000 pounds, calculated on a dry basis.

After sufficient time has elapsed for the pulp to become thoroughly saturated with the red liquor, usually one hour, the stock is greatly diluted with water, for example, 10,000 pounds of water. Approximately 420 pounds of lime, preferably as milk of lime, are added to neutralize the acid and precipitate the resin. The stock is then beaten from 2 to 40 hours depending on the beater, kind of fibers used, etc.

After proper beating the wet pulp containing the resin on and around the fibers thereof is laminated wet by a multiple ply formation on a paper machine of the wet type to obtain an interlocking of the fibers of the several plies. The wet laminations built up to the desired thickness are dried and molded under heat and pressure employing the usual range of temperatures and pressures. The temperatures and pressures employed will of course vary with the size, shape and thickness of the product molded.

It is to be observed that no laminating is done after the pulp is dried. Ordinarily, laminating takes place after the pulp is dried, the laminations being built up to any desired thickness. For example, in making say ⅛ inch laminated sheet material ordinarily 8 thicknesses of pretreated 25 mil thick paper are taken, stacked and molded. According to our invention the thickness required for the final product is built up on the machine with wet pulp stock, the mass dried and molded without further lamination.

Example 2

Wet fibrous pulp having incorporated therewith a suitable binder e. g. a phenolic molding resin, is prepared in accordance with the method outlined in the patent to Stevenson and Buron, No. 1,771,150, dated July 22, 1930.

The wet pulp is laminated wet and treated as outlined above in Example 1 to form molded products therefrom.

In practicing the present invention it is preferable to introduce the resin prior to the formation of the laminations on the paper machine as illustrated in the descriptive examples given above. While the illustrative examples mention specifically resins of the phenol-formaldehyde and aniline-formaldehyde types the invention is not limited to the use of these materials. For example, shellac, rosin, gum accroides, vinyl resins, alkyd resins, urea-formaldehyde resins, styrol and the like may be used. Also fillers, such as clay, asbestos, mica, talc, silica, etc. may be incorporated into the mass at any convenient point in the process, and similarly coloring agents such as dyes, pigments and the like may be used.

Very good results are obtained by means of the process of our invention and the process is particularly useful when thicknesses of 50 mils or over are to be molded. We have successfully made by means of our invention products of thickness as high as 300 mils without laminating the pulp after it is dried. Due to the fact that the requisite thickness of stock is built up by machine rather than by hand an economical gain is made in manufacture. Where such articles as refrigerator door strips are concerned the process of our invention is extremely useful. Such strips are easily and economically made from fibrous pulp containing suitable resin by means of our invention.

What we claim as new and desire to secure by Letters Patent of the United States, is:

1. The process of producing a relatively thick laminated pulp product which comprises building up and simultaneously interlocking fibers of wet pulp containing a resinous composition on and around the fibers thereof to a thickness such that the final molded product is 50 mils or over, drying the built-up wet mass, and molding under heat and pressure.

2. The process of producing a laminated pulp product of a final thickness of at least 50 mils which comprises preparing a "fiber flow" stock by building up to the requisite thickness a plurality of layers of interlocking fibers of wet pulp containing a phenolic resin on and around the fibers thereof, drying the built-up wet mass, and molding under heat and pressure.

3. A relatively thick laminated product produced by molding under heat and pressure dried fibers of pulp containing a resinous composition on and around the fibers thereof, the fibers being built up and interlocked while wet, the final thickness of the molded product being at least 50 mils.

ROY H. KIENLE.
WILLIAM J. SCHEIBER.